United States Patent [19]
Dewberry et al.

[11] Patent Number: 4,873,747
[45] Date of Patent: Oct. 17, 1989

[54] APPARATUS AND METHOD FOR MOUNTING A RESILIENT FINGER TO A POULTRY PLUCKING APPARATUS OR THE LIKE

[75] Inventors: Larry S. Dewberry, Marietta, Ga.; Richard H. Schlipp, Delafield, Wis.

[73] Assignee: Waukesha Rubber Company, Inc., Waukesha, Wis.

[21] Appl. No.: 272,762

[22] Filed: Nov. 17, 1988

Related U.S. Application Data

[63] Continuation-in-part of Ser. No. 153,994, Feb. 9, 1988, Pat. No. 4,799,293.

[51] Int. Cl.$^4$ ............................................. A22C 21/02
[52] U.S. Cl. .................................... 17/11.1 R; 17/47
[58] Field of Search ............................. 17/11.1 R, 47

[56] References Cited

U.S. PATENT DOCUMENTS

| | | | |
|---|---|---|---|
| 1,372,595 | 3/1921 | Bouda | 17/11.1 R |
| 2,300,157 | 10/1942 | Hunt | 17/11.1 R |
| 3,537,128 | 11/1970 | Zebarth et al. | 17/11.1 R |
| 3,797,068 | 3/1974 | Dillon | 17/11.1 R |
| 3,959,850 | 6/1976 | Crane | 17/11.1 R |
| 4,282,632 | 8/1981 | Conaway | 17/11.1 R |
| 4,292,709 | 10/1981 | van Mill | 17/11.1 R |

Primary Examiner—Willis Little
Attorney, Agent, or Firm—Andrus, Sceales, Starke & Sawall

[57] ABSTRACT

A resilient finger for use in connection with a poultry plucking apparatus or the like is provided with a head portion capable of being pushed through an opening provided in a movable member associated with the apparatus. The head portion is provided with a resilient base portion which deforms sufficiently so as to allow the head portion to pass through the opening provided in the movable member. After passing through the opening, the resilient base portion returns to its undeformed state and grips the area of the movable member adjacent the opening against a shoulder portion formed on the shank of the resilient finger. A neck having a reduced transverse dimension relative to the shoulder and the base of the head portion is disposed within the opening upon installation. The base of the head portion is preferably provided with one or more protrusions which deform during passage through the opening and thereafter return to their undeformed state. The protrusions provide areas of increased transverse dimension at the base of the head portion in order to retain the finger within the opening. A method of mounting a resilient finger to a movable member is also disclosed in accordance with the above, and includes the step of rotating the finger about its longitudinal axis during insertion through the opening, in order to ease such insertion.

12 Claims, 5 Drawing Sheets

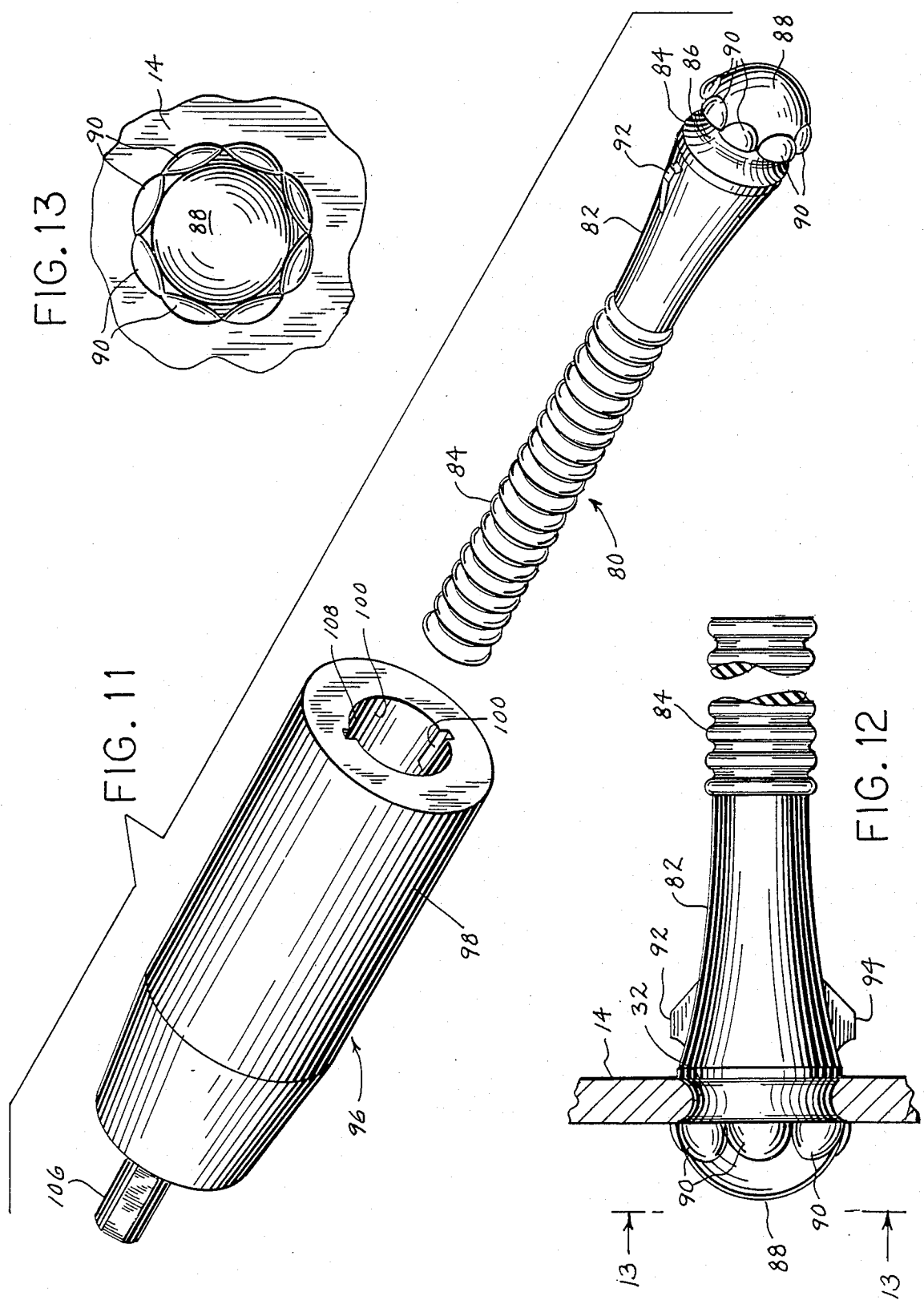

4,873,747

APPARATUS AND METHOD FOR MOUNTING A RESILIENT FINGER TO A POULTRY PLUCKING APPARATUS OR THE LIKE

CROSS REFERENCE TO RELATED APPLICATION

This application is a continuation-in-part of application Serial No. 07/153,994 filed Feb. 9, 1988 now U.S. Pat. No. 4,799,293.

BACKGROUND AND SUMMARY

This invention relates to a poultry processing apparatus or the like, and more particularly to a resilient finger for use in connection with such an apparatus.

A poultry processing apparatus for plucking feathers from poultry generally includes a series of movable members having a plurality of resilient fingers connected thereto. One type of plucking apparatus utilizes a pair of spaced rotatable drums, each having a number of resilient fingers mounted to its side. The drums are arranged so that a space is provided between the resilient fingers. The poultry is passed through the space between the drums while the drums are rotating, and the action of the fingers on the poultry removes the feathers from the poultry. Another type of plucking apparatus utilizes a series of opposed spaced rotatable discs. Each disc has a series of resilient fingers mounted thereto and extending therefrom toward the opposed series of discs. The poultry is passed through the space between the discs while the discs are rotated, and the action of the fingers mounted to the discs removes the feathers from the poultry as it passes between the discs.

The resilient fingers utilized in connection with each of the above-described lucking machines generally include a shank portion terminating at a shoulder portion, a neck portion of reduced diameter relative to the shoulder portion, and a head portion connected to the neck portion. The discs or drums are provided with a number of openings therethrough, each of which is adapted to receive one resilient finger. A known method of mounting the fingers to the discs or drums involves inserting the tip of the finger through the opening from the rear side of the disc or drum, and then pulling on the ribbed section to distort the shank portion until the neck snaps into the opening. The finger is then retained on the disc or drum by engagement of the area adjacent the opening between the head portion and the shoulder portion.

Mounting the resilient fingers to the discs or drums as described can be a difficult and time consuming operation. It is typical to grip the shank of the finger with a clamping type jawed tool after insertion through the opening, and then to pull outwardly on the tool away from the drum or disc to engage the neck portion with the opening. However, the shank of the finger must deform a significant amount in order to allow the finger to pass through the opening so as to engage the neck portion with the edges of the opening. This generally requires the person performing the installation to exert a great amount of force in order to install the fingers as described. Further, the amount of time involved in performing this installation procedure can result in a substantial amount of maintenance time for the entire machine, which can be costly and inefficient. Also, with a disc type plucking machine, access to the openings near the center of the disc from the rear may be obstructed by the disc housing.

The present invention is intended to provide a mounting structure for a resilient finger for use in a poultry processing apparatus or the like, and is designed to eliminate or alleviate the above-discussed shortcomings of previous structures. In accordance with the invention, a mounting structure for a member, such as a resilient finger, adapted to be mounted to a movable member for a poultry processing apparatus or the like through an opening provided therein comprises a shoulder portion provided on the resilient member and having a transverse dimension greater than that of the opening in the movable member. A neck portion is provided adjacent the shoulder portion, and has a reduced transverse dimension relative thereto. A head portion is provided on the resilient member adjacent the neck portion, and has a resilient base portion adjacent the neck portion with a transverse dimension greater than that of the neck portion, and at least slightly greater than that of the opening in the movable member. The resilient finger is capable of being mounted to the movable member by pushing the head portion through the opening therein so that the base portion of the head portion deforms a sufficient amount so as to allow the head portion to pass through the opening. Thereafter, the neck portion is disposed within the opening, and the base portion returns to its undeformed state so that the movable member is gripped between the base portion and the shoulder portion so as to retain the resilient finger on the movable member. In one embodiment, the head portion has side portions extending between the base portion and a top which is spaced from the base portion. The side portions of the head portion are provided with one or more threads which are adapted to engage one or more teeth provided on the movable members and which extend into the openings provided therein. The resilient finger is twisted during mounting to the movable member, and mounting of the resilient finger to the movable member is facilitated by the engagement of the one or more threads on the head portion with the teeth provided in the opening.

A method is also disclosed which contemplates mounting a resilient finger to a movable member by pushing a head portion through an opening provided therein, generally in accordance with the above-noted features of the resilient finger.

In accordance with another embodiment of the invention, the base of the head portion is provided with a series of protrusions about its circumference. The protrusions provide an increased diameter at the base of the head portion at predetermined spaced intervals about its circumference. This construction increases the surface area of the base of the head portion which contacts the area of the movable member adjacent the opening, for better retaining the finger thereon. The protrusions are preferably regularly spaced radially about the circumference of the base of the head portion.

A method is also disclosed in which the finger is twisted or rotated during insertion of the head portion through the opening, without provision of any threads in the side of the head portion. It has been found that this method of inserting the head portion through the opening is highly satisfactory. The method contemplates provision of a specially constructed sleeve adapted for insertion into the chuck of a rotary power tool, with the sleeve having an inner passage adapted to receive most of the length of the finger. The head, neck and shoulder portions of the finger extend outwardly from the sleeve, so that the head portion may be satisfactorily inserted into the opening. If desired, the shank portion may be provided with ears and the inner passage of the sleeve provided with slots adapted to receive such ears for ensuring that no slippage occurs between the sleeve and the finger during insertion.

By forming the above-mentioned protrusions on the base of the head portion and rotating the finger during insertion, the protrusions deform a sufficient amount so as to pass through the opening and thereafter return to their undeformed state for gripping the areas of the movable member adjacent the opening.

To accommodate return of the head portion of the finger to its undeformed state after insertion through the opening, the edges of the movable member forming the opening are provided with a radius on both sides. This construction eases deformation of the head portion for allowing it to pass through the opening, and accommodates return of the base of the head portion to its undeformed condition after insertion.

BRIEF DESCRIPTION OF THE DRAWINGS

The drawings illustrate the best mode presently carrying out the invention.

In the drawings:

FIG. 11 is an isometric view of a resilient finger incorporating protrusions formed at the base of the head portion, and a sleeve adapted for placement into the chuck of a rotary tool for rotating the finger to accommodate insertion of the finger head portion into an opening;

FIG. 12 is a side elevation view of the finger shown in FIG. 11 as inserted into an opening in a movable member;

FIG. 13 is an elevation view of the head portion of the finger of FIG. 12 as installed in an opening, reference being made to line 13—13 of FIG. 12;

DETAILED DESCRIPTION OF THE PREFERRED EMBODIMENT

Figure 1:
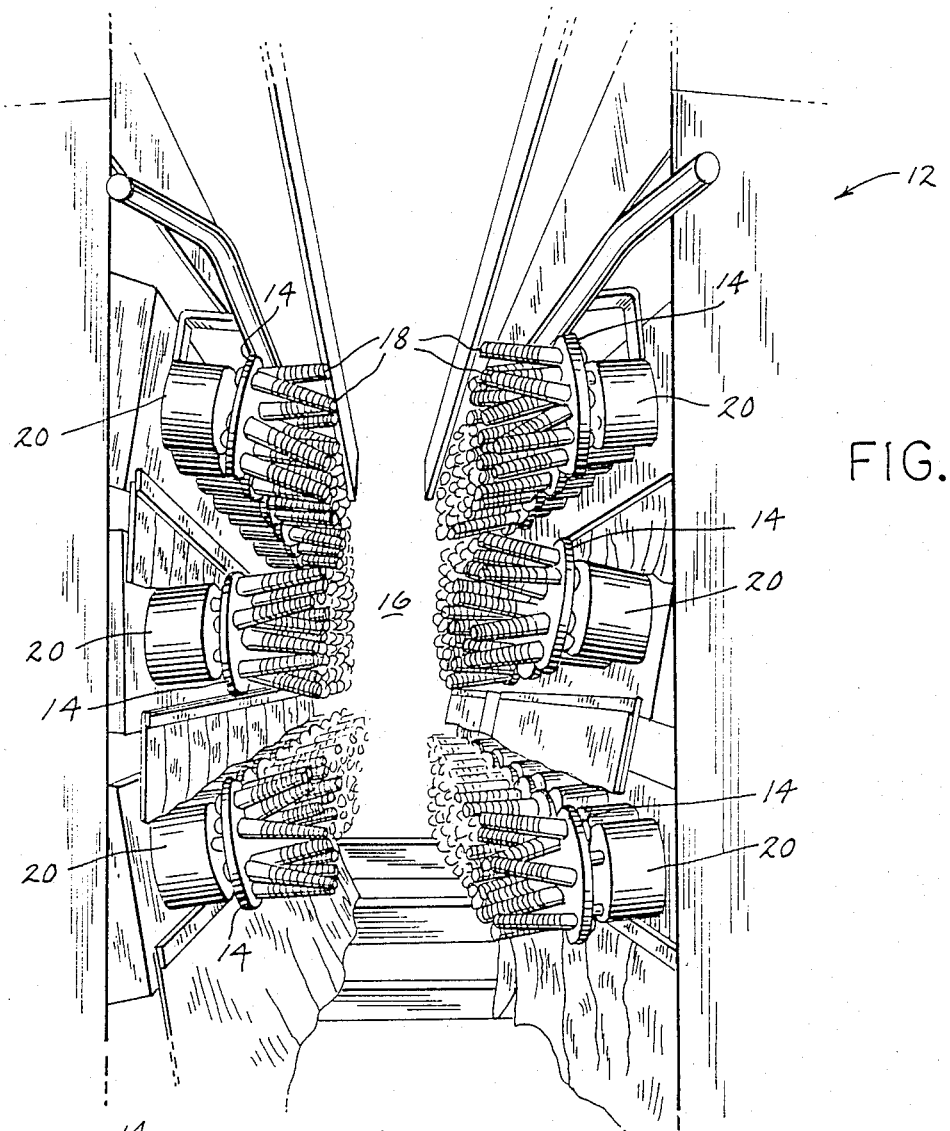
FIG. 1 is a perspective view of a disc-type poultry plucking apparatus.

As shown in FIG. 1, a disc type poultry plucking machine 12 includes a number of rows of aligned discs, shown at 14. The rows of discs 14 are provided on opposite sides of a passage 16 through the machine, through which poultry such as chickens, turkeys or the like pass during processing. Plucking machine 12 is designed to remove feathers from poultry as it passes through passage 16.

A plurality of resilient fingers, shown at 18, are mounted to each disc 14 through a plurality of openings provided therein. Fingers 18 are constructed of a resilient material such as a rubber compound, and generally have a durometer reading between 55 and 70 on an A scale. Each disc 14 is connected to a housing 20, and each disc 14 is rotatable about its central axis on housing 20. Such rotation of discs 14 about their central axes causes fingers 18 to move in a circular path thereabout.

Each finger 18 is provided with a series of ribs 22 on its shank portion 24. During operation of plucking machine 12 as described, ribs 22 impinge upon the poultry passing through passage 16 to remove feathers from the poultry.

Figure 2:
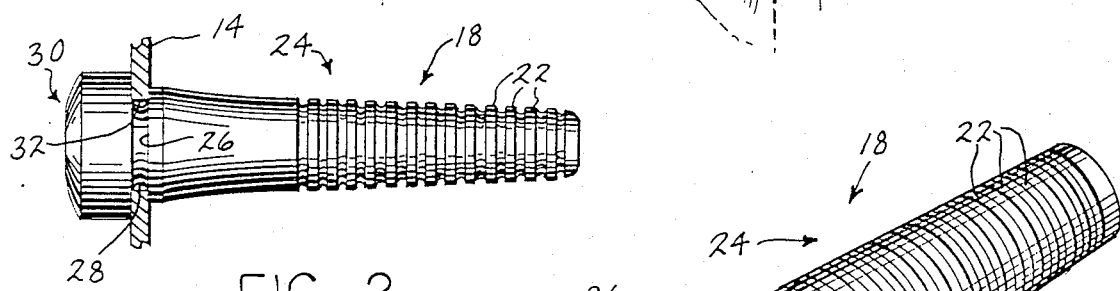
FIG. 2 is a side elevation view, partially in section, showing a prior art resilient finger for use in connection with the apparatus of FIG. 1.

FIG. 2 shows a prior art construction for resilient fingers 18. Shank portion 24 of finger 18 terminates in a shoulder 26, from which a neck portion 28 extends. An enlarged head portion 30 is connected to neck portion 28. As shown, the proximal end of shank portion 24 adjacent shoulder 26 has a transverse dimension greater than that of an opening 32 provided in disc 14. Neck portion 28 has a transverse dimension less than that of opening 32, and head portion 30 has a transverse dimension substantially larger than that of opening 32. With this construction, shank 24 is inserted through opening 32 in disc 14 from the rear, and then drawn through opening 32 by pulling shank portion 24 therethrough. The proximal end of shank portion 24 deforms sufficiently during this operation so as to allow passage of shank portion 24 through opening 32. Thereafter, neck portion 28 is disposed within opening 32 and shoulder 26 engages the area of disc 14 adjacent opening 32 on one side, while head portion 30 engages the other side of disc 14 adjacent opening 32. In this manner, disc 14 is "gripped" between head portion 30 and shoulder portion 26 so as to retain finger 18 on disc 14.

Figure 3:
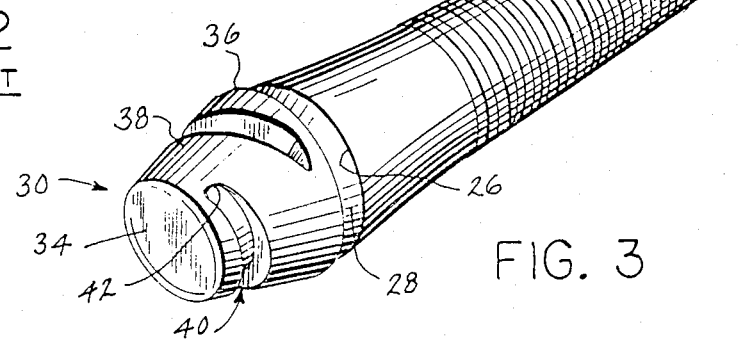
FIG. 3 is an isometric view of a resilient finger constructed according to the invention for use with the apparatus of FIG. 1.
Figure 4:
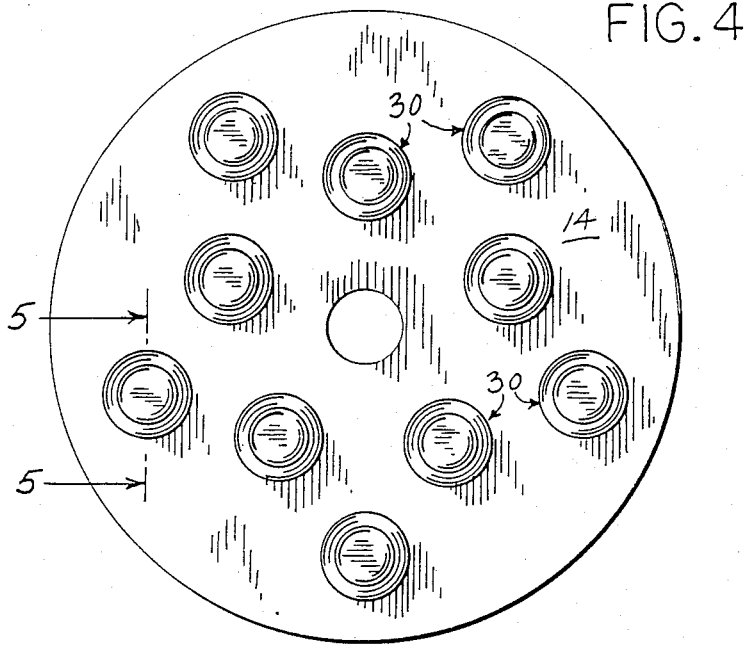
FIG. 4 is an elevation view showing an individual disc from the poultry plucking apparatus of FIG. 1 to which a plurality of fingers constructed according to the invention are mounted.

FIG. 3 shows an improved resilient finger for use with plucking machine 12 in place of the construction shown in FIG. 2. In the drawings, like reference characters will be used to describe the finger according to the invention to facilitate clarity. As shown in FIG. 3, finger 18 includes a series of ribs 22 formed on shank portion 24. A shoulder portion 26 is formed on the proximal end of shank portion 24, from which a neck portion 28 extends. Head portion 30 is substantially frusto-conical in shape, and includes a top 34 spaced from a base 36. A side 38 extends between top 32 and base 34, and is disposed at an angle to top 34 so as to increase the width of head portion 30 toward base 36.

Figure 5:
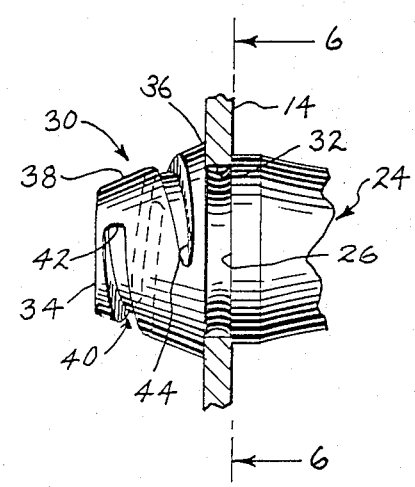
FIG. 5 is a partial sectional view taken generally along line 5—5 of FIG. 4.

As shown in FIG. 5, the transverse dimension of base 36 of head portion 30 is greater than that of opening 32 in disc 14.

Side portion 38 of head 30 is provided with a helical groove or thread, shown at 40. Helical thread 40 extends from a point just below top 34, shown at 42, around side portion 38 of head 30, and terminates at a terminus 44 disposed above and adjacent base portion 36 of head 30.

Figure 6:
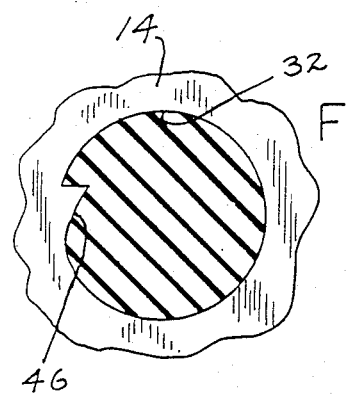
FIG. 6 is a sectional view taken generally along line 6—6 of 5.

As shown in FIG. 6, a tooth 46 is formed in plate 14 and projects into opening 32. Tooth 46 is adapted to engage helical thread 40 to facilitate the mounting of finger 18 to disc 14.

To install finger 18 as shown in FIGS. 3 and 5 onto disc 14, top 34 of head 30 is inserted from the front of disc 14 through opening 32. Tooth 46 is engaged with helical thread 40 at or adjacent point 42. Head 30 is pushed through opening 32 while turning finger 18 so that, due to such pushing and twisting of shank 24, head 30 advances within opening 32. When tooth 46 reaches terminus 44 of thread 40, additional force is applied to finger 18 so as to force base portion 36 of head 30 through opening 32. Base portion 36 of head 30 deforms sufficiently to allow head 30 to pass through opening 32, whereafter neck portion 28 is disposed within opening 32. After passing through opening 32, head portion 30 returns to its original undeformed condition, with base portion 36 engaging the area of disc 14 adjacent opening 32. Shoulder 26 of shank 24 engages the area of disc 14 adjacent opening 32 on the other side of disc 14. In this manner, disc 14 is essentially "gripped" between base portion 36 of head 30 and shoulder portion 26 of shank 24 to firmly retain finger 18 on disc 14. If necessary, a suitable lubricant such as soap can be used to facilitate passage of head portion 30 through opening 32.

Figure 7:
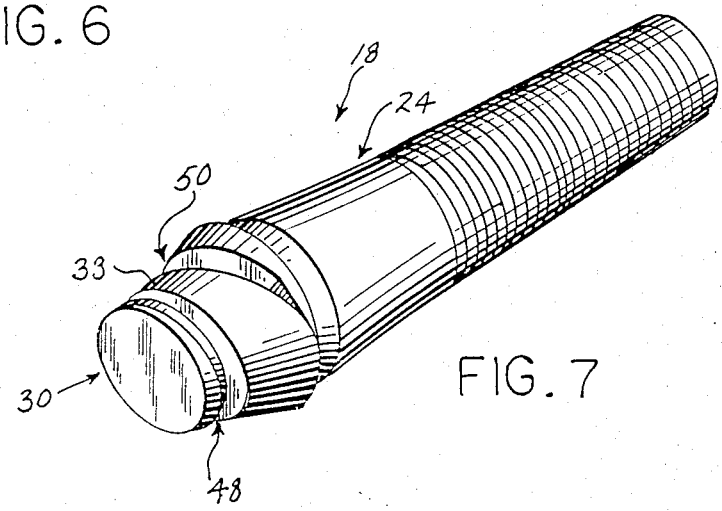
FIG. 7 is an isometric view similar to FIG. 3, showing another of the resilient finger constructed according to the invention.
Figure 8:
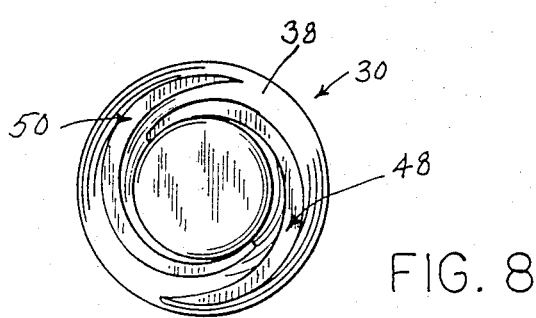
FIG. 8 is a top elevation view of the head portion of the resilient finger of FIG. 7.

Another embodiment of the invention is shown in FIGS. 7 and 8. In this embodiment, a pair of helical threads, shown at 48, 50 are provided on side portion 38 of head 30. Each thread 48, 50 extends less than a full turn around the circumference of head 30. With this construction, a pair of teeth are provided in opening 32 to engage the distinct threads 48, 50. Finger 18 is mounted to disc 14 as above described, with each tooth engaging a separate thread.

Figure 9:
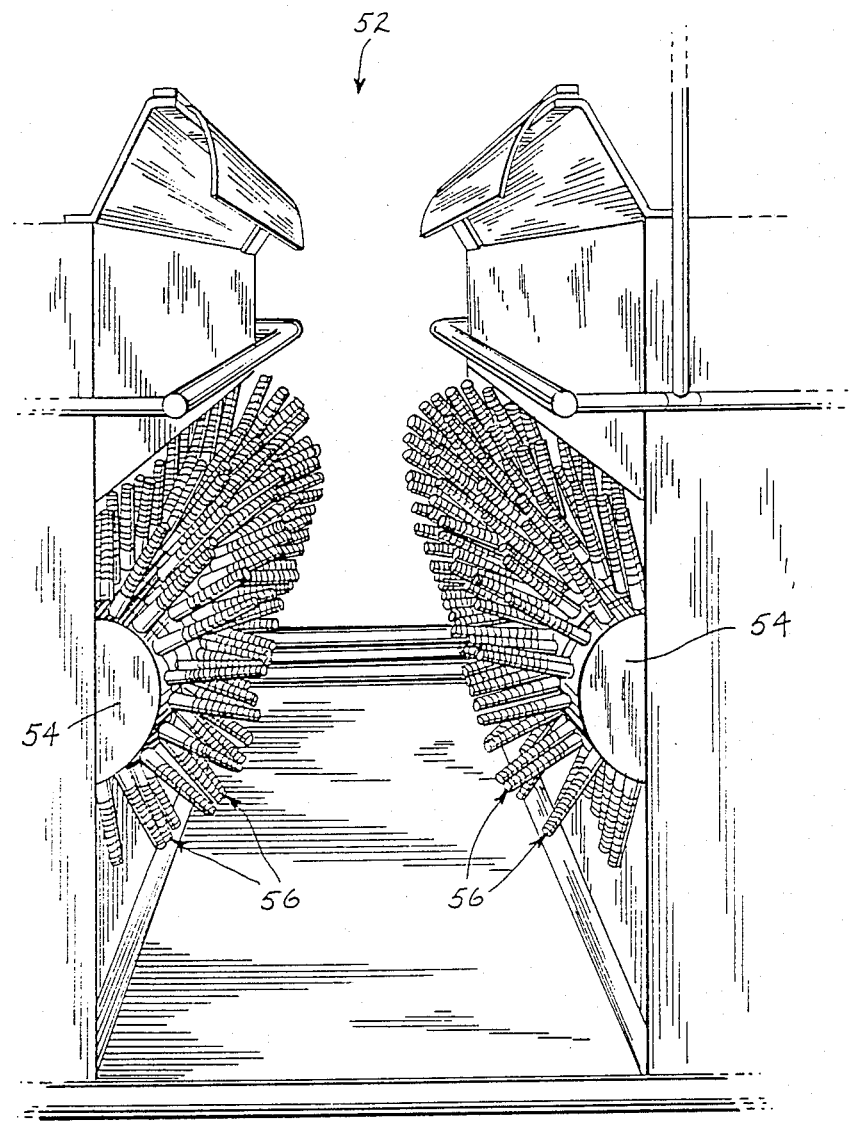
FIG. 9 is a respective view of a drum type poultry plucking apparatus.

With reference to FIG. 9, a drum type poultry plucking machine is shown generally at 52. Drum type plucking machine 52 includes a pair of spaced rotatable drums 54, each of which is rotatable about its longitudinal axis. A plurality of fingers 56 are mounted to drums 54 so as to extend outwardly therefrom. Fingers 56 used with drum type plucking machine 52 are more elongated and slender than fingers 18 used with disc type plucking machine 12, and generally have a durometer reading between 45 and 60 on an A scale. Fingers 56 are adapted for mounting to drums 54 through a series of spaced openings provided in the side walls of drums 54.

Figure 10:
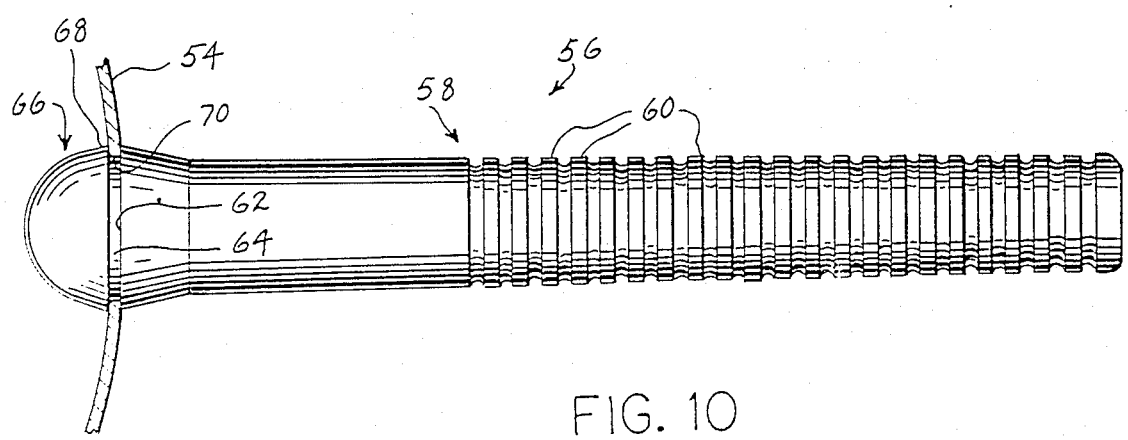
FIG. 10 is a view similar to FIGS. 2 and 5, showing an alternate embodiment for a resilient finger constructed according to the invention for use with the apparatus of FIG. 9.

With reference to FIG. 10, finger 56 includes a shank portion 58 on which a series of ribs 60 are formed. A shoulder 62 is provided at the proximal end of shank 58 adjacent drum 54. A neck 64 extends from shoulder 62 and has a reduced transverse dimension relative to shoulder 62. A head portion 66 extends from neck portion 64. Head portion 66 is relatively rounded in shape, and includes a flared circumferential lip 68 at its base adjacent neck 64.

To install finger 56 onto drum 54 through an opening, such as 70, formed therein, head portion 66 is inserted into opening 70. Finger 56 is then pushed toward drum 54 so that head portion 66, and more particularly lip 68, deforms inwardly toward neck 64 a sufficient amount to allow head portion 66 to pass through opening 70. Once head 66 has passed through opening 70, neck portion 64 is disposed within opening 70 and flared lip 68 returns to its undeformed state. The area of drum 54 adjacent opening 70 is then gripped between shoulder 62 and the base portion of flared lip 68 to retain finger 56 on drum 54. Again, a suitable lubricant can be used to facilitate passage of head portion 66 through opening 70 in drum 54.

It is contemplated that a tapered sleeve type tool will aid in the installation of the resilient fingers described above. The taper of the sleeve roughly corresponds to the taper of the shank of the resilient finger, to provide a sure engagement of the tool with the finger. The sleeve is pushed and/or turned, either manually or with the aid of a driving mechanism, to install the fingers.

With reference to FIG. 11, another embodiment of a resilient finger for mounting in a poultry processing apparatus is shown generally at 80. Finger 80 includes a shank portion 82 and a ribbed portion 84. Shank 82 terminates in a shoulder 84, and a neck 86 of reduced diameter is provided adjacent shoulder 84. A head portion 88 is disposed adjacent neck 86.

Neck 86 has a concave curvature when viewed in cross section, as seen in FIG. 12, and is formed by cutting a groove about the circumference of finger 80 in the area between head 88 and shoulder 84. As shown, the concave curvature of neck 86 corresponds to and mates with rounded surfaces provided on the surfaces of disc 14 adjacent opening 32.

The base of head 88 adjacent neck 86 is provided with a series of protrusions 90 about its circumference. Protrusions 90 provide a scalloped structure at the base of head 88, as shown in FIG. 13. Protrusions 90 are preferably integrally formed with head portion 88 during molding.

Shank 82 has a pair of outwardly projecting ears 92, 94 formed thereon, the purpose of which will be explained.

Figure 14:
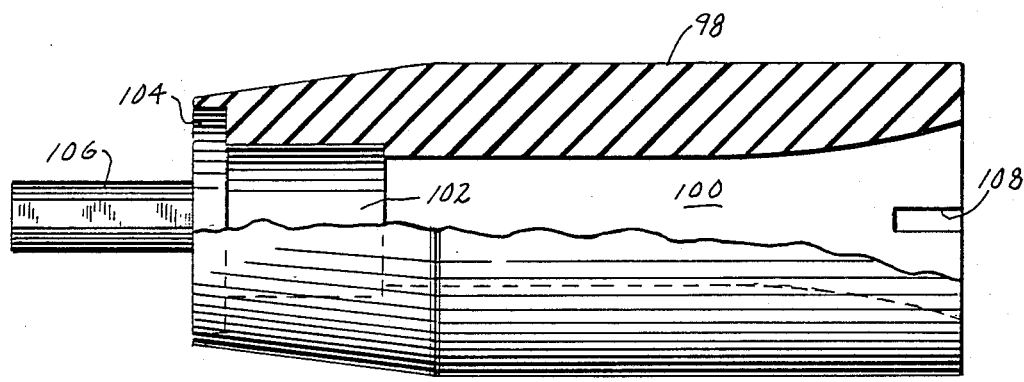
FIG. 14 is a side elevation view, with a portion broken away and in section, showing the insertion sleeve of FIG. 11.

Referring to FIGS. 11 and 14, a sleeve 96 is provided for aiding insertion of finger 80 into opening 32 of disc 14 by forcing head portion 88 therethrough. Sleeve 96 comprises a substantially cylindrical body portion 98 having an open end and providing an inner passage 100 therethrough. Cylindrical body portion 98 is preferably formed of a hard rubber material. A metal plug 102 including a base 104 is fitted within one end of cylindrical portion 98 of sleeve 96. A shank 106 extends from base 104, and is adapted to be received within the chuck of a rotatable tool such as a variable speed drill or the like. A satisfactory bonding agent is provided between the outer surfaces of plug 102 and base 104 and the inner surface of cylindrical member 98 for securing such surfaces together. With this construction, a satisfactory tool for inserting finger 80 into plate opening 32 is provided. As noted, sleeve 96 may be formed of a resilient hard rubber material, as shown, or alternatively may be constructed of any other rigid or semirigid material such as a satisfactory metal.

With reference to FIGS. 11 and 14, the inner walls of cylindrical member 98 forming passage 100 are provided at one end with a pair of slots 108, 110. Slots 108, 110 are adapted to receive ears 92, 94 formed on finger shank portion 82 when finger 80 is inserted into inner passage 100 to provide positive engagement of finger 80 with sleeve 96. In the environment in which poultry plucking fingers such as 80 are employed, it is often the case that poultry fat or other such substances are present which may cause slippage between finger 80 and the wall forming inner passage 100 during insertion of finger 80. Additionally, it is advantageous to employ a satisfactory lubricant to ease passage of head 88 of finger 80 through passage 32. Slippage between finger 80 and sleeve 96 may be caused if such lubricant is spilled or used excessively so as to become present on the surface of finger shank portion 82 and the wall forming passage 100. The positive engagement of sleeve 96 with finger 80 from engagement of ears 92, 94 with slots 108, 110 overcomes the problem of slippage during insertion of finger 80.

As shown, the inner wall of cylindrical portion 98 forming passage 100 is provided with an outwardly tapered or flared portion at its end where slots 108, 110 are provided. This outwardly flared portion of passage 100 is adapted to mate with and engage an outward taper provided on shank 82 of finger 80. In a dry environment, it is contemplated that the frictional engagement of the inner wall of cylindrical portion 98 with shank 82 will satisfactorily ensure rotation of finger 80 upon rotation of sleeve 96.

In operation, shank 106 of sleeve 96 is inserted into the chuck of a rotatable tool such as a variable speed drill or the like. A finger, such as 80, is inserted into passage 100 in sleeve 96 so that shank portion 82 thereof securely engages the outwardly tapered wall portion provided at the end of passage 100. Ears 92, 94 are then mated with slots 108, 110. The operator then positions finger head 88 into opening 32 in disc 14, and actuates the rotatable tool to which sleeve 96 is connected so as to cause rotation of finger 80. While such rotation of sleeve 96 and finger 80 is in progress, the operator exerts a force normal to the outer surface of disc 14 so as to force finger head portion 88 through opening 32 until shoulder 84 of finger 80 engages the outer surface of disc 14. When this position is attained, finger head portion 88 has been forced through opening 32 and finger 80 is securely engaged to disc 14.

During rotation of finger 80 as it is being forced through opening 32, protrusions 90 deform laterally and longitudinally so as to accommodate passage of finger head portion 88 through opening 32. The provision of protrusions 90 as illustrated provides radially spaced areas of increased and decreased diameter about the circumference of the base of head 88. During insertion, the areas of increased diameter tend to deflect toward the areas of decreased diameter so as to provide satisfactory deformation of protrusions 90 for allowing insertion of head 88 through opening 32. After head 88 has been completely forced through opening 32, protrusions 90 return to their undeformed state, thereby once again forming radially spaced areas of increased diameter of the base portion of head 88. This construction provides a series of "feet" which engage the inner surface of disc 14 adjacent opening 32 to firmly grip disc 14 between shoulder 84 and the base of head portion 88 to securely retain finger 80 on disc 14.

As shown, the inner and outer surfaces of disc 14 at opening 32 are rounded, for accommodating deformation of head portion 88, including protrusions 90, during insertion thereof through opening 32. The narrowest transverse dimension of opening 32 is provided midway through the thickness of disc 14, with the rounded inner and outer surfaces of disc 14 at opening 32 providing a relatively smooth transition thereto and therefrom during insertion of head portion 88. That is, rounding of the outer surface of disc 14 at opening 32 forces protrusions 90 to deform an amount sufficient to pass through the narrowest dimension of opening 32. Similarly, rounding of the inner surface of disc 14 at opening 32 accommodates return of protrusions 90 to their undeformed condition after passage through the narrowest dimension of opening 32. With this construction, neck 86 can be formed so as to provide a longitudinal dimension substantially equal to the thickness of disc 14 at opening 32. Once finger 80 is in place as shown in FIG. 12, the inner and outer surfaces of disc 14 adjacent opening 32 are engaged by and gripped between the "feet" provided by protrusions 90 and shoulder 84, respectively. Finger 80 is thus firmly mounted to disc 14 and difficult to remove therefrom after connection in this manner.

While the inner and outer surfaces of disc 14 are shown as being rounded at opening 32, it is understood that a bevelled surface may also be satisfactorily employed.

As shown, the cross section of neck 86 is formed so as to correspond closely to that of opening 32. This construction has been found to be advantageous in that, upon installation and during use, the shank, neck and head portions of finger 80 typically expand due to presence of heat and moisture in the environment. This expansion causes the surface of neck portion 86 to engage the surface defining opening 32 so as to provide an even more secure connection of finger 80 to plate 14.

Figure 15:
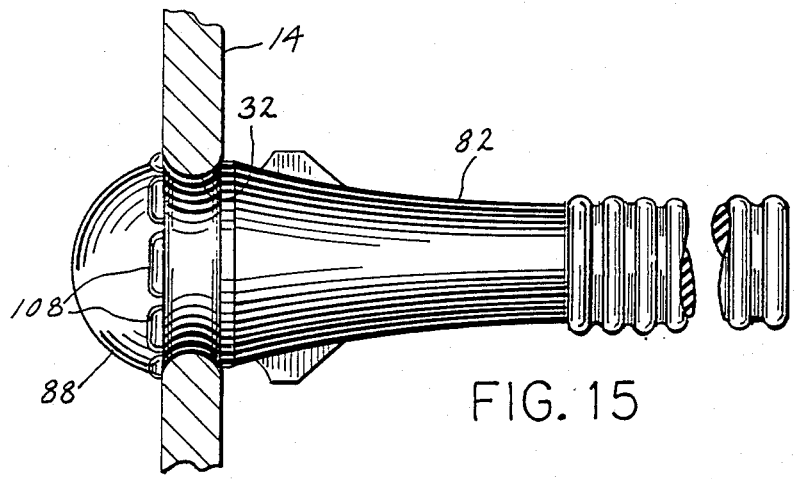
FIG. 15 is a view similar to FIG. 12, showing another embodiment of the protrusions formed at the base of the head portion for retaining the finger in place.

As shown in FIG. 12, protrusions 90 are somewhat semicircular or semielliptical when viewed in elevation. As shown in FIG. 15, an alternate embodiment of the invention provides protrusions 108, which are of a substantially lesser height than protrusions 90 (FIG. 12). Protrusions 108 (FIG. 15) operate on the same principal as protrusions 90 (FIG. 12), while reducing the amount of material required to form such protrusions.

Figure 16:
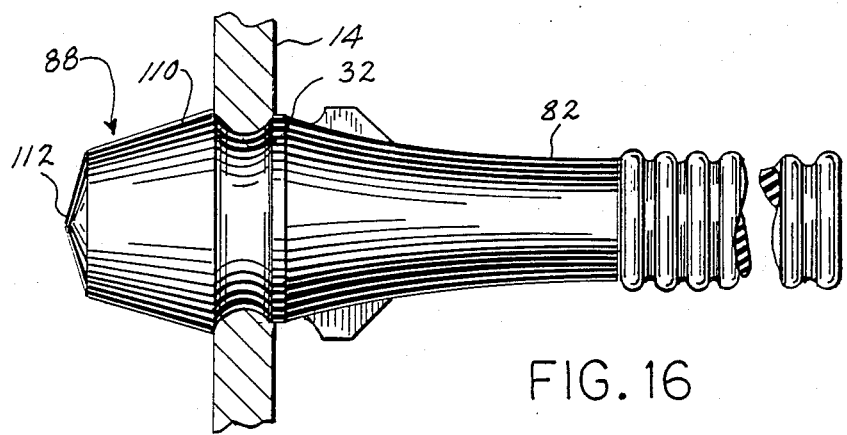
FIG. 16 is a view similar to FIGS. 12 and 15, showing another embodiment of the head portion.

With reference to FIG. 16, it is seen that head portion 88 is formed so as to be substantially frusto conical, including a tapered side portion 110 and a conical top 112. The upper end of tapered side portion 110 adjacent conical top 112 has a transverse dimension approximately equal to the narrowest dimension of opening 32 in disc 14. It has been found that, with this construction, head portion 88 can satisfactorily be inserted through opening 32 by employment of the above-described series of steps. During insertion of head portion 88 through opening 32, the lower lip of the base of head portion 88 adjacent neck portion 86 deforms into neck 86 so as to allow the major portion of side portion 110 to pass through opening 32. Once shoulder 84 is in place against the surface of disc 14 adjacent opening 32, the lower end of side portion 110 which has been so deformed, upon continued rotation during insertion, rides on the rounded surfaces of disc 14 forming opening 32 so as to return to its undeformed state wherein disc 14 is gripped between the lower lip of head 88 and shoulder 84.

Various alternatives and modifications are contemplated as being within the scope of the following claims particularly pointing out and distinctly claiming the invention.

We claim:

1. An assembly for use in a poultry processing apparatus or the like, comprising:
   a movable member including one or more openings extending between an inner and an outer surface;
   one or more fingers adapted for mounting in said one or more openings, each said finger comprising:

a shank terminating in a shoulder adapted for placement adjacent the outer surface of said movable member and having a transverse dimension greater than that of said opening;

a neck provided against said shoulder and adapted for placement within said opening and having a reduced transverse dimension relative to said shoulder;

a head provided adjacent said neck and having a base portion, wherein said base portion is provided with a series of spaced resilient protrusions about its periphery providing a transverse dimension to said base portion greater than that of said opening, said head being adapted for insertion through said opening for mounting said finger to said movable member, whereby each said protrusion deforms during insertion so as to allow said head to pass through said opening, said protrusions providing a lower surface adapted to engage the area of said movable member adjacent said opening after insertion of said finger head therethrough and return of said protrusions to their undeformed condition, for retaining said finger on said movable member; and means for accommodating passage of said head through said opening in said movable member by providing deformation of said base portion of said head as it passes through said opening and thereafter allowing said base portion of said head to return to its undeformed condition for securing said finger to said movable member by positioning of said finger head on one side of said movable member and said finger shoulder on the other side of said movable member.

2. A resilient poultry plucking finger for use in a poultry plucking apparatus and adapted for mounting in an opening extending between inner and outer surfaces of a movable member associated with said apparatus, comprising:

a shank terminating in a shoulder adapted for placement adjacent the outer surface of said movable member and having a transverse dimension greater than said opening;

a neck provided adjacent said shoulder and adapted for placement within said opening;

a head provided adjacent said neck and having:
a base portion including one or more surfaces adapted for placement adjacent the inner surface of said movable member and providing a transverse dimension to said base portion greater than the least transverse dimension of said opening;
a top portion spaced from said base portion having a transverse dimension less than the least transverse dimension of said opening; and
a side portion extending between said top portion and said base portion and providing an increasing transverse dimension to said head between said top portion and said base portion;

said head being adapted to be inserted through said opening by deforming an amount sufficient to allow passage of said head therethrough, said head thereafter returning to its undeformed condition so as to retain said finger on said movable member by placement of said base portion of said head adjacent the outer surface of said movable member and placement of said shoulder of said shank adjacent the inner surface of said head.

3. The finger of claim 2, wherein said one or more surfaces providing a transverse dimension to said base portion greater than the least transverse dimension of said opening comprises a series of radially spaced protrusions provided about the periphery of the base portion of said head.

4. A method of mounting a resilient finger to a movable member associated with a poultry plucking apparatus or the like, said movable member having an opening extending between an inner surface and an outer surface thereof, comprising the steps of:

forming said resilient finger so as to provide a shoulder having a transverse dimension greater than the least dimension of said opening; a neck adjacent said shoulder and having a transverse dimension less than that of said shoulder; and a head adjacent said neck and including a base portion having one or more surfaces providing a transverse dimension to said base portion greater than the least dimension of said opening, a top portion spaced from said base portion and being adapted to fit within said opening, and a side portion extending between said top portion and said base portion and providing an increasing transverse dimension to said head between said top portion and said base portion; and inserting said finger head through said opening by means of a push-on motion in a direction from said outer surface toward said inner surface of said movable member until engagement of said shoulder with the area of said outer surface of said movable member adjacent said opening, thereby causing deformation of said base portion of said head during passage of said head through said opening, said base portion returning to its undeformed condition after passing through said opening, so that the inner surface of said movable member is engaged by the base portion of said head and the outer surface of said movable member is engaged by the shoulder of said finger for retaining said finger on said movable member.

5. The method according to claim 4, further comprising the step of forming said opening so as to provide a transitional area between the inner and outer surfaces of said movable member adjacent said opening to accommodate deformation of said base portion of said head so as to pass through said opening.

6. The method according to claim 5, wherein the step of forming said opening so as to provide a transitional area between said inner and outer surfaces adjacent said opening comprises providing a radius between the wall of said opening and the outer surface of said movable member adjacent said opening.

7. The method according to claim 4, further comprising the step of rotating said finger about its longitudinal axis simultaneously with said step of inserting said finger head through said opening.

8. The method according to claim 7, wherein the step of rotating said finger comprises the steps of:

providing a sleeve having an inner passage throughout at least a portion of its length;

inserting said shank of said finger into the inner passage in said sleeve such that the inner wall of said sleeve forming said inner passage engages said shank portion; and rotating said sleeve while exerting an axial force thereon for easing insertion of said finger head through said opening.

9. The method according to claim 8, wherein the step of rotating said sleeve comprises interconnecting said sleeve with a rotatable tool adapted to rotate said sleeve about its longitudinal axis.

10. The method according to claim 9, wherein the step of rotating said sleeve comprises providing said sleeve with a shank extending coaxially with the longitudinal axis of said sleeve, mounting said shank within the chuck, of a rotatable tool, and operating said rotatable tool so as to rotate said sleeve about its longitudinal axis and thereby said finger about its longitudinal axis.

11. The method according to claim 8, further comprising the step of providing positive engagement means between the inner wall of said sleeve and said shank of said finger for avoiding slippage therebetween during insertion of said finger head through said opening.

12. The method according to claim 11, wherein the step of providing positive engagement means comprises forming one or more ears on the shank of said finger and forming one or more slots in the inner wall of said sleeve forming said passage, for receiving said one or more ears when said finger shank is inserted into said sleeve passage.

* * * * *

UNITED STATES PATENT AND TRADEMARK OFFICE
CERTIFICATE OF CORRECTION

PATENT NO. : 4,873,747
DATED : October 17, 1989
INVENTOR(S) : DEWBERRY ET AL

It is certified that error appears in the above-identified patent and that said Letters Patent is hereby corrected as shown below:

Claim 1, Col. 9, Line 5, delete "against" and substitute therefor --- adjacent ---.

Signed and Sealed this

Fifth Day of March, 1991

Attest:

HARRY F. MANBECK, JR.

*Attesting Officer*  *Commissioner of Patents and Trademarks*